US 6,542,604 B1

(12) United States Patent
Blon et al.

(10) Patent No.: US 6,542,604 B1
(45) Date of Patent: Apr. 1, 2003

(54) SCALED IMPEDANCE REPLICA FOR ECHO ATTENUATION IN DIGITAL TRANSMISSION SYSTEMS

(75) Inventors: Thomas Blon, Jengen (DE); Martin Gröpl, München (DE); Michael Moyal, München (DE); Daniel Joffe, Huntsville, AL (US)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/144,820

(22) Filed: Aug. 31, 1998

(51) Int. Cl.[7] ................................................. H04M 1/00
(52) U.S. Cl. .................... 379/398; 379/399.01; 379/394
(58) Field of Search ................................. 379/394, 398, 379/399.01, 406.01, 344, 403, 404

(56) References Cited

U.S. PATENT DOCUMENTS 6,181,791 B1 * 1/2001 Murphy ................. 379/406.01

FOREIGN PATENT DOCUMENTS

| EP | 0 346 874 A2 | 12/1989 |
| EP | 0 503 528 A2 | 9/1992 |
| EP | 0 693 846 A2 | 1/1996 |

* cited by examiner

Primary Examiner—Forester W. Isen
Assistant Examiner—Jefferey Harold
(74) Attorney, Agent, or Firm—Laurence A. Greenberg; Werner H. Stemer; Gregory L. Mayback

(57) ABSTRACT

A device for echo attenuation in a digital transmission system comprises an impedance replica of the transmission path. The impedance replica consists of a terminating resistance replica, a transformer replica, and a transmission line replica. The device may further comprise a bridged tap replica. The transformer replica and the bridged tap replica are provided as on-chip components. The main transformer inductance replica and all components of the bridged tap replica are variable and may be set by software control.

19 Claims, 1 Drawing Sheet

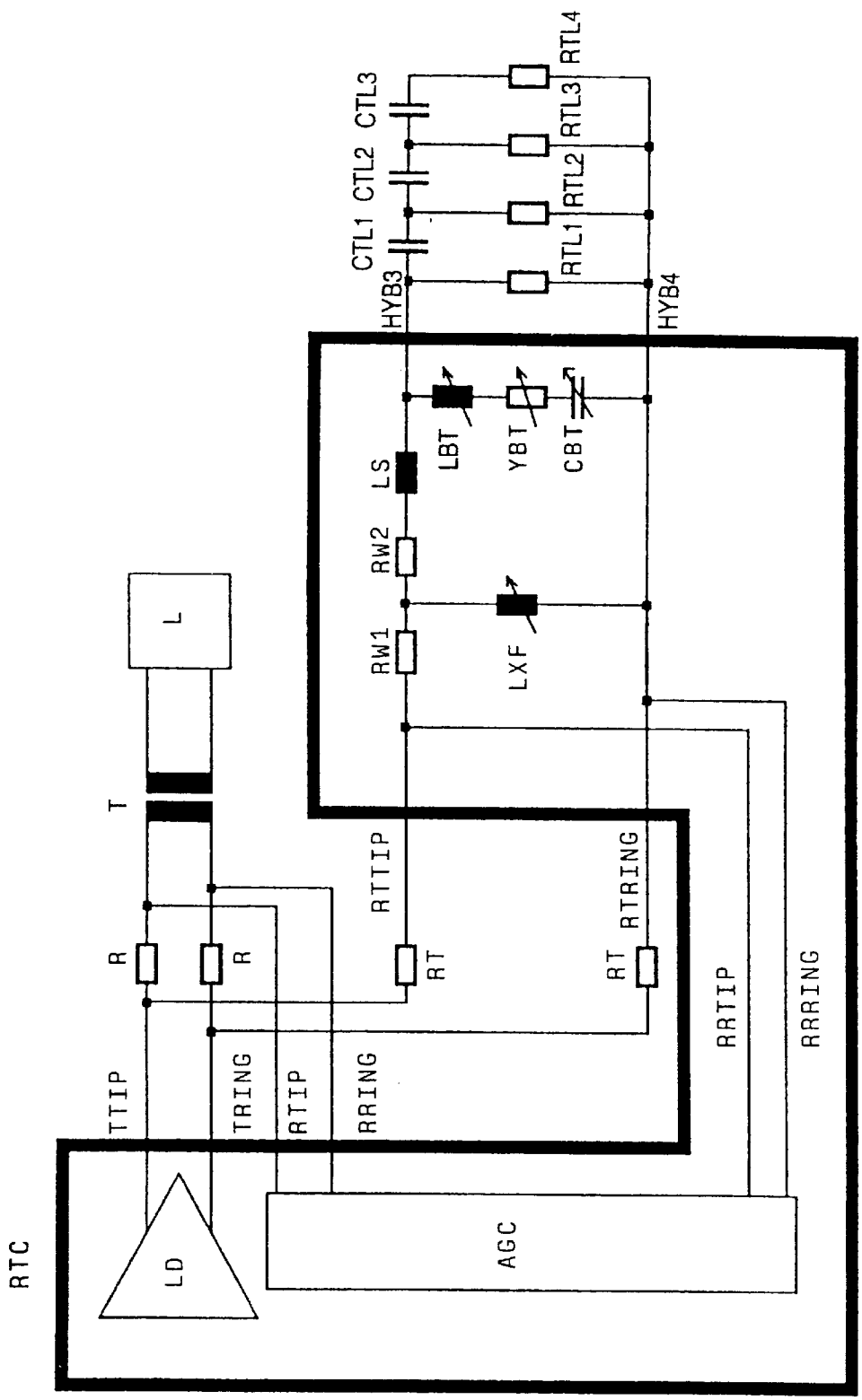

SCALED IMPEDANCE REPLICA FOR ECHO ATTENUATION IN DIGITAL TRANSMISSION SYSTEMS

BACKGROUND OF THE INVENTION

FIELD OF THE INVENTION

In digital transmission systems like ISDN or XDSL, the same pair of wire carries transmit signals and receive signals between point A and point B. Unless special precautions are taken, the reflected signal of the transmitter is superimposed on the received signal. The reflected signal of the transmitter is known as echo. The received signal will be called the far end signal in the following. Echo signals superimposed on the far end signal give rise to two major problems:

a) The receive path input has to be designed for high input levels. The signal to noise ratio (S/N) is decreased as a result.

b) Digital linear echo compensators in conventional ISDN and XDSL transmission systems are provided after the analog receive path. Such linear echo compensators are not able to subtract nonlinear distortion components from the echo. Thus, the signal to distortion ratio (S/D) has to be kept very low. In order to overcome the above mentioned problems it has been suggested to provide a scaled impedance replica of the transmission path consisting of resistors, capacitors and inductors outside a transmitter/receiver chip. The impedance replica generates a signal which is nearly identical to the echo generated on the real transmission path (tx-path). The signal of the real transmission line contains the echo plus the far end signal. The far end signal can therefore be retrieved by subtracting the replica signal from the signal on the real transmission line. This procedure is known as echo attenuation. For a sufficient echo attenuation it is necessary to have an exact impedance replica. A transmission channel may be simulated with different loops, each loop requiring a different impedance replica. The impedance replica has to be adjustable in order to achieve sufficient echo attenuation for each loop. Prior art semiconductor chips have pins to add or remove some of the passive components in the replica network. These pins and the necessity of external passive components to be attached to the chip increase the complexity of the hardware as well as the difficulty of operation. A further disadvantage is that the above-described external impedance replica is only a compromise solution and provides sufficient echo attenuation only for a few test loops.

SUMMARY OF THE INVENTION

It is accordingly an object of the invention to provide a device for echo attenuation in a digital transmission system, which overcomes the above-mentioned disadvantages of the heretofore-known devices of this general type and which provides sufficient echo attenuation.

With the foregoing and other objects in view there is provided, in accordance with the invention, a device for echo attenuation in a digital transmission system using an impedance replica of a transmission path, comprising an impedance replica of a transmission path, the impedance replica including a terminating resistance replica, a transformer replica connected to the terminating resistance replica, and a transmission line replica connected to the transformer replica.

In accordance with a further feature of the invention, the impedance replica further comprises a bridged tap replica connected in the transmission line replica.

In accordance with another feature of the invention, the echo attenuation device further comprises a replica tip line and a replica ring line, and the bridged tap replica is connected in parallel between the replica tip line and the replica ring line.

In accordance with yet another feature of the invention, the bridged tap replica comprises a series circuit including an inductance, a capacitance and a resistance.

In accordance with a further feature of the invention, the inductance, the capacitance and the resistance are adjustable.

In accordance with another feature of the invention, the transformer replica comprises a primary winding resistance replica, a secondary winding resistance replica connected to the primary winding resistance replica, a transformer main inductance replica connected to the primary winding resistance replica and to the secondary winding resistance replica, and a transformer stray inductance replica connected to the secondary winding resistance replica.

In accordance with yet another feature of the invention, the transformer main inductance replica is a variable inductance replica.

In accordance with a further feature of the invention, the replica tip line and the replica ring line form a replica loop, wherein the transformer main inductance replica is connected in parallel between the replica tip line and the replica ring line, and wherein the primary winding resistance replica, the secondary winding resistance replica, and the transformer stray inductance replica are connected in series in the replica loop.

In view of the object of the invention there is also provided a receiver/transmitter device of a digital transmission system comprising an impedance replica having a terminating resistance replica, a transformer replica connected to the terminating resistance replica, and a transmission line replica connected to the transformer replica for generating a replica signal for echo attenuation, and a subtractor connected to the impedance replica for receiving the replica signal and a signal of a transmission line.

The pure echo signal is established by connecting the device for echo attenuation, i.e. the replica loop, to the tip and ring terminals of the receiver/transmitter device in front of the terminating resistors.

In a preferred embodiment, the transformer replica is an on-chip component of a receiver/transmitter chip.

In accordance with another preferred embodiment of the invention, the impedance replica comprises a bridged tap replica connected in the transmission line replica, the bridged tap replica being an on-chip component.

In accordance with yet another preferred embodiment of the invention, the terminating resistance replica and the transmission line replica are on-chip components of the receiver/transmitter chip.

Thus the values of the components of the bridged tap replica and the main transformer inductance replica, which are adjustable, can be set by programming the receiver/transmitter chip.

Other features which are considered as characteristic for the invention are set forth in the appended claims.

Although the invention is illustrated and described herein as embodied in a scaled impedance replica for echo attenuation in digital transmission systems, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWING

FIG. 1 is a schematic circuit diagram of a receiver/transmitter chip comprising a device for echo attenuation in accordance with the invention.

DESCRIPTION OF THE PREFERRED EMBODIMENTS

Referring now to FIG. 1, there is schematically illustrated a receiver/transmitter chip. The receiver/transmitter chip is indicated by the bold line and comprises a line driver LD for driving the tip and ring signal lines TTIP and TRING. The digital transmission system comprises the terminating resistors R and R, a transformer T, and a loop L. Signals are sent to the loop L via the tip and ring signal lines TTIP and TRING. A signal that the receiver/transmitter chip RTC receives from the loop is fed into the chip by signal lines RTIP and RRING. The signal lines RTIP and RRING are connected to the tip and ring lines TTIP, TRING at points located between the terminating resistors R, R and the transformer T. The received signals are fed into an element AGC of the chip RTC. The element AGC functions as a subtractor.

The received far end signals are superimposed by echo signals. The echo signals are generated by transmitting signals with the line driver LD. It is therefore necessary to remove the echo signal. This is accomplished by generating artificial or replica echo signals and subtracting them from the received sum of far end signals and echo signals. The impedance replica comprises a replica transmit tip line RTTIP and a replica transmit ring line RTRING connected to a transformer replica, a bridged tap replica and a signal loop replica (cable replica).

The characteristics of the transformer T are reproduced by the transformer replica comprising a primary winding resistance replica RW1, a secondary winding resistance replica RW2, a transformer main inductance replica LXF and a transformer stray inductance replica LS, wherein the transformer main inductance replica LXF is adjustable.

The bridged tap replica comprises an inductance replica LBT, a capacitance replica CBT and a resistance replica YBT in series. Each component of the bridged tap replica is adjustable.

The cable replica or transmission line replica comprises a plurality of RC-components RTL1, CTL1, RTL2, CTL2, RTL3, CTL3, and RTL4. The off-chip RC-ladder hooked to the Pins HYB3 and HYB4 is a replica for the input impedance of a 15 kilo-ft AWG26 cable.

The circuit further comprises a terminating resistance replica, or terminating resistor replicas RT, RT which can be on-chip or off-chip.

The replica echo signal is fed via lines RRTIP and RRRING to the subtractor AGC. The sum of the echo signal and the far end signal forms the received signal of the real transmission. The far end signal is provided by subtracting the replica echo signal from the received signal of the real transmission.

The on-chip part of the impedance replica comprises the transformer replica and bridged tap replica components wherein the adjustable parts of the transformer and bridged tap replicas can be set by software control.

The following describes an exemplary embodiment of the scaled impedance replica for echo attenuation in digital transmission systems. The exemplary embodiment is optimized to work with ANSI-ISDN test loops. In case the bridged tap replica is disabled, the impedance replica comprises the remaining on-chip and off-chip components. Such an impedance replica matches the impedance of ANSI-ISDN loops without bridged taps close to the line input very well. Adequate adjusting of LBT, YBT and CBT provides good impedance matching also for loops with bridged taps close to the line input. All integrated inductors are realized as gyrators. LXF can be trimmed or adjusted to match varying main inductances of the transformer in the transmission path.

In the above-described exemplary embodiment the external compromise impedance replica (CTL, RTL) has been supplemented by an almost fully integrated impedance replica. The impedance replica takes each component of the transmission system into detailed account. With the integration of the bridge tap replica and transformer main inductance replica, it is possible to trim or adjust the impedance replica path such that it can match various transmission loops providing excellent echo attenuation.

We claim:

1. A device for echo attenuation in a digital transmission system, comprising:

an impedance replica of a transmission path, said impedance replica including a terminating resistance replica, a transformer replica connected to said terminating resistance replica, a transmission line replica connected to said transformer replica, a bridged tap replica connected in said transmission line replica, a replica tip line and a replica ring line, said bridged tap replica being connected in parallel between said replica tip line and said replica ring line.

2. The device according to claim 1, wherein said bridged tap replica comprises a series circuit including an inductance, a capacitance and a resistance.

3. The device according to claim 2, wherein said inductance, said capacitance and said resistance are adjustable.

4. The device according to claim 1, wherein said transformer replica comprises a primary winding resistance replica, a secondary winding resistance replica connected to said primary winding resistance replica, a transformer main inductance replica connected to said primary winding resistance replica and to said secondary winding resistance replica, and a transformer stray inductance replica connected to said secondary winding resistance replica.

5. The device according to claim 4, wherein said transformer main inductance replica is a variable inductance replica.

6. The device according to claim 4, wherein said replica tip line and said replica ring line form a replica loop, wherein said transformer main inductance replica is connected in parallel between said replica tip line and said replica ring line, and wherein said primary winding resistance replica, said secondary winding resistance replica, and said transformer stray inductance replica are connected in series in said replica loop.

7. The device according to claim 1, wherein said transformer replica is an on-chip component.

8. The device according to claim 1, wherein said impedance replica includes a bridged tap replica connected in said transmission line replica, said bridged tap replica is an on-chip component.

9. A receiver/transmitter device of a digital transmission system comprising:

an impedance replica having a terminating resistance replica, a transformer replica connected to said terminating resistance replica, a transmission line replica connected to said transformer replica for generating a replica signal for echo attenuation, a bridged tap replica connected in said transmission line replica, a replica tip line and a replica ring line, said bridged tap replica being connected in parallel between said replica tip line and said replica ring line; and a subtractor connected to said impedance replica for receiving the replica signal and a signal of a transmission line.

10. The receiver/transmitter device according to claim 9, wherein said transformer replica is an on-chip component.

11. The receiver/transmitter device according to claim 9, wherein said bridged tap replica is an on-chip component.

12. The receiver/transmitter device according to claim 9, wherein said terminating resistance replica and said transmission line replica are on-chip components.

13. A device for echo attenuation in a digital transmission system, comprising:

an impedance replica of a transmission path, said impedance replica including a terminating resistance replica, a transformer replica connected to said terminating resistance replica, and a transmission line replica connected to said transformer replica, said transformer replica including a primary winding resistance replica, a secondary winding resistance replica connected to said primary winding resistance replica, a transformer main inductance replica connected to said primary winding resistance replica and to said secondary winding resistance replica, and a transformer stray inductance replica connected to said secondary winding resistance replica.

14. The device according to claim 13, wherein said impedance replica further includes a bridged tap replica connected in said transmission line replica.

15. The device according to claim 14, which further comprises a replica tip line and a replica ring line, and said bridged tap replica is connected in parallel between said replica tip line and said replica ring line.

16. The device according to claim 15, wherein said bridged tap replica further includes a series circuit including an inductance, a capacitance and a resistance.

17. The device according to claim 16, wherein said inductance, said capacitance and said resistance are adjustable.

18. The device according to claim 13, wherein said transformer main inductance replica is a variable inductance replica.

19. The device according to claim 13, wherein said replica tip line and said replica ring line form a replica loop, said transformer main inductance replica is connected in parallel between said replica tip line and said replica ring line, and said primary winding resistance replica, said secondary winding resistance replica, and said transformer stray inductance replica are connected in series in said replica loop.

* * * * *